US008640188B2

(12) United States Patent
Riley et al.

(10) Patent No.: US 8,640,188 B2
(45) Date of Patent: *Jan. 28, 2014

(54) METHODS, SYSTEMS, AND COMPUTER READABLE MEDIA FOR PROVIDING GROUP POLICY CONFIGURATION IN A COMMUNICATIONS NETWORK USING A FAKE USER (75) Inventors: Yusun Kim Riley, Weston, MA (US); Uri Baniel, Buffalo Grove, IL (US)

(73) Assignee: Tekelec, Inc., Morrisville, NC (US)

( * ) Notice: Subject to any disclaimer, the term of this patent is extended or adjusted under 35 U.S.C. 154(b) by 124 days.

This patent is subject to a terminal disclaimer.

(21) Appl. No.: 12/973,186

(22) Filed: Dec. 20, 2010

(65) Prior Publication Data
US 2011/0167471 A1 Jul. 7, 2011

Related U.S. Application Data (60) Provisional application No. 61/292,058, filed on Jan. 4, 2010, provisional application No. 61/405,631, filed on Oct. 21, 2010.

(51) Int. Cl.
G06F 17/00 (2006.01)
(52) U.S. Cl.
USPC .............................................................. 726/1
(58) Field of Classification Search
USPC ........................................................ 726/1, 4
See application file for complete search history.

(56) References Cited

U.S. PATENT DOCUMENTS

| 6,141,686 | A  | 10/2000 | Jackowski et al. |
| 6,651,101 | B1 | 11/2003 | Gai et al. |
| 6,661,780 | B2 | 12/2003 | Li |
| 6,880,005 | B1 | 4/2005  | Bell et al. |
| 7,209,962 | B2 | 4/2007  | Boden |
| 7,289,498 | B2 | 10/2007 | Yu et al. |

(Continued)

FOREIGN PATENT DOCUMENTS

| EP | 1 551 144 A1 | 7/2005 |
| EP | 2 045 974 A1 | 9/2011 |

(Continued)

OTHER PUBLICATIONS

Notification of Transmittal of the International Search Report and the Written Opinion of the International Searching Authority, or the Declaration for International Patent Application No. PCT/US2010/061589 (Sep. 26, 2011).

(Continued)

*Primary Examiner* — Brandon Hoffman
*Assistant Examiner* — Anthony Brown
(74) *Attorney, Agent, or Firm* — Jenkins, Wilson, Taylor & Hunt, P.A.

(57) ABSTRACT

Methods, systems, and computer readable media for providing group policy configuration in a communications network using a fake user are disclosed. The method is performed at a policy and charging rules function (PCRF) node. According to one method, first policy profile information associated with a first subscriber identifier is obtained from a policy profile database, where the first subscriber identifier is associated with a first subscriber. Second policy profile information associated with a second subscriber identifier is obtained from the policy profile database, where the second subscriber identifier is associated with a group of subscribers that also includes the first subscriber. At least a portion of the second policy profile information is applied to the first subscriber.

16 Claims, 4 Drawing Sheets

(56) References Cited

U.S. PATENT DOCUMENTS

| | | | |
|---|---|---|---|
| 7,581,249 | B2 | 8/2009 | Bussiere et al. |
| 7,719,966 | B2 | 5/2010 | Luft et al. |
| 7,940,683 | B2 | 5/2011 | Dolganow et al. |
| 8,042,148 | B2 | 10/2011 | Andreasen et al. |
| 8,131,831 | B1 | 3/2012 | Hu |
| 8,146,133 | B2 | 3/2012 | Moon et al. |
| 8,159,941 | B2 | 4/2012 | Dolganow et al. |
| 8,250,646 | B2 | 8/2012 | Zheng |
| 8,429,268 | B2 | 4/2013 | Riley et al. |
| 8,433,794 | B2 | 4/2013 | Baniel et al. |
| 8,458,767 | B2 | 6/2013 | Riley et al. |
| 2002/0143914 | A1 | 10/2002 | Cihula |
| 2002/0188562 | A1 | 12/2002 | Igarashi et al. |
| 2003/0208523 | A1 | 11/2003 | Gopalan et al. |
| 2004/0111519 | A1 | 6/2004 | Fu et al. |
| 2005/0088977 | A1 | 4/2005 | Roch et al. |
| 2005/0122945 | A1 | 6/2005 | Hurtta |
| 2006/0013191 | A1 | 1/2006 | Kavanagh |
| 2006/0233101 | A1 | 10/2006 | Luft et al. |
| 2007/0004393 | A1 | 1/2007 | Forsberg et al. |
| 2007/0066286 | A1 | 3/2007 | Hurtta |
| 2007/0121812 | A1 | 5/2007 | Strange et al. |
| 2007/0159976 | A1 | 7/2007 | Dekeyzer et al. |
| 2007/0220251 | A1 | 9/2007 | Rosenberg et al. |
| 2007/0226775 | A1 | 9/2007 | Andreasen et al. |
| 2007/0242692 | A1* | 10/2007 | Limb et al. ............ 370/465 |
| 2007/0286117 | A1* | 12/2007 | Balasubramanian et al. 370/328 |
| 2008/0046963 | A1 | 2/2008 | Grayson et al. |
| 2008/0076388 | A1 | 3/2008 | Nochimowski et al. |
| 2008/0120700 | A1 | 5/2008 | Pandey et al. |
| 2008/0137541 | A1 | 6/2008 | Agarwal et al. |
| 2008/0201772 | A1 | 8/2008 | Mondaeev et al. |
| 2008/0232376 | A1 | 9/2008 | Huang et al. |
| 2008/0276305 | A1 | 11/2008 | Chan et al. |
| 2008/0313708 | A1 | 12/2008 | Khan et al. |
| 2009/0089418 | A1 | 4/2009 | Saha et al. |
| 2009/0177650 | A1 | 7/2009 | Petersson et al. |
| 2009/0196225 | A1 | 8/2009 | Avila Gonzalez et al. |
| 2009/0222538 | A1* | 9/2009 | Takahashi et al. ............ 709/221 |
| 2009/0227231 | A1 | 9/2009 | Hu et al. |
| 2009/0228956 | A1 | 9/2009 | He et al. |
| 2009/0285225 | A1 | 11/2009 | Dahod |
| 2009/0307028 | A1* | 12/2009 | Eldon et al. ............ 705/7 |
| 2009/0323536 | A1 | 12/2009 | Liu et al. |
| 2010/0040047 | A1 | 2/2010 | Zamora et al. |
| 2010/0121960 | A1 | 5/2010 | Baniel et al. |
| 2010/0185488 | A1 | 7/2010 | Hogan et al. |
| 2010/0235877 | A1 | 9/2010 | Hu et al. |
| 2011/0022702 | A1 | 1/2011 | Riley et al. |
| 2011/0022722 | A1 | 1/2011 | Castellanos Zamora et al. |
| 2011/0041182 | A1 | 2/2011 | Stenfelt |
| 2011/0111767 | A1 | 5/2011 | Livanos |
| 2011/0170412 | A1 | 7/2011 | Ramadas et al. |
| 2011/0202653 | A1 | 8/2011 | Riley et al. |
| 2011/0219426 | A1 | 9/2011 | Kim et al. |
| 2011/0225280 | A1 | 9/2011 | Delsesto et al. |
| 2011/0225306 | A1 | 9/2011 | Delsesto et al. |
| 2011/0225309 | A1 | 9/2011 | Riley et al. |
| 2011/0296489 | A1 | 12/2011 | Fernandez Alonso et al. |
| 2012/0084425 | A1 | 4/2012 | Riley et al. |
| 2012/0131165 | A1 | 5/2012 | Baniel et al. |
| 2012/0144049 | A1 | 6/2012 | Lopez Nieto et al. |

FOREIGN PATENT DOCUMENTS

| | | |
|---|---|---|
| KR | 10-2006-0028042 | 3/2006 |
| KR | 10-2009-0027861 | 3/2009 |
| WO | WO 2007/092573 A2 | 8/2007 |
| WO | WO 2008/000287 A1 | 1/2008 |
| WO | WO 2008/114217 A1 | 9/2008 |
| WO | WO 2009/149341 | 12/2009 |
| WO | WO 2010/086013 A1 | 8/2010 |
| WO | WO 2011/011790 A2 | 1/2011 |
| WO | WO 2011/100684 A2 | 8/2011 |
| WO | WO 2011/109821 A2 | 9/2011 |
| WO | WO 2011/115991 A2 | 9/2011 |

OTHER PUBLICATIONS

Commonly-assigned, co-pending U.S. Appl. No. 13/225,390 for "Method and System for Providing Mobility Management in Network", (Unpublished, filed on Sep. 2, 2011).

Non-Final Official Action for U.S. Appl. No. 12/479,179 (Aug. 2, 2011).

Notice of Allowance and Fee(s) Due for U.S. Appl. No. 12/621,190 (May 29, 2012).

Non-Final Official Action for U.S. Appl. No. 13/225,390 (May 14, 2012).

Communication of European publication number and information on the application of Article 67(3) EPC for European Application No. 10803020.6 (May 4, 2012).

Final Official Action for U.S. Appl. No. 12/479,179 (Apr. 10, 2012).

Applicant-Initiated Interview Summary for U.S. Appl. No. 12/621,190 (Feb. 7, 2012).

Notification of Transmittal of the International Search Report and the Written Opinion of the International Searching Authority, or the Declaration for International Application No. PCT/US2011/027427 (Nov. 15, 2011).

Notification of Transmittal of the International Search Report and the Written Opinion of the International Searching Authority, or the Declaration for International Application No. PCT/US2011/028520 (Oct. 31, 2011).

Notification of Transmittal of the International Search Report and the Written Opinion of the International Searching Authority, or the Declaration for International Application No. PCT/US2011/024753 (Oct. 28, 2011).

Non-Final Official Action for U.S. Appl. No. 12/621,190 (Aug. 3, 2011).

Notification of Transmittal of the International Search Report and the Written Opinion of the International Searching Authority, or the Declaration for International Application No. PCT/US2010/043258 (Feb. 28, 2011).

"3rd Generation Partnership Project; Technical Specification Group Core Network and Terminals; Policy and Charging Control over Rx reference point (Release 9)," 3GPP TS 29.214, V9.3.0, pp. 1-45, (Mar. 2010).

"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).

"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).

3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).

Hakala et al., "Diameter Credit-Control Application," Network Working Group RFC 4006, pp. 1-114 (Aug. 2005).

Zhou et al., "Prophet Address Allocation for Large Scale MANETs," Ad Hoc Networks, vol. 1, Issue 4, pp. 423-434 (Nov. 2003).

Calhoun et al., "Diameter Base Protocol," RFC 3588, pp. 1-147 (Sep. 2003).

Ponnappan et al., "A Policy Based QoS Management System for the IntServ/DiffServ Based Internet," Policies for Distributed Systems and Networks, pp. 159-168 (2002).

Commonly-assigned, co-pending U.S. Appl. No. 13/157,052 for "Methods, Systems, and Computer Readable Media for Providing Nested Policy Configuration in a Communications Network", (Unpublished, filed on Jun. 9, 2011).

Restriction Requirement for U.S. Appl. No. 12/479,179 (Feb. 8, 2011).

(56) References Cited

OTHER PUBLICATIONS

Notification of Transmittal of the International Search Report and the Written Opinion of the International Searching Authority, or the Declaration for International Application No. PCT/US2009/046395 (Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (Downloaded from the Internet on May 13, 2009) (May 28, 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).
Non-Final Office Action for U.S. Appl. No. 13/048,629 (Feb. 15, 2013).
Final Office Action for U.S. Appl. No. 12/479,179 (Feb. 15, 2013).
Non-Final Office Action for U.S. Appl. No. 13/048,597 (Feb. 1, 2013).
Notice of Allowance and Fee(s) Due for U.S. Appl. No. 13/042,294 (Jan. 30, 2013).
Communication of European Publication Number and Information on the Application of Article 67(3) EPC for European Patent Application No. 11756855.0 (Jan. 4, 2013).
Notice of Allowance and Fee(s) Due for U.S. Appl. No. 12/621,190 (Dec. 27, 2012).
Communication of European Publication Number and Information on the Application of Article 67(3) EPC for European Patent Application No. 11751508.0 (Dec. 12, 2012).
Communication of European publication number and information on the application of Article 67(3) EPC for European Application No. 11742958.9 (Nov. 21, 2012).
Notice of Allowance and Fee(s) Due for U.S. Appl. No. 13/225,390 (Oct. 9, 2012).
Non-Final Official Action for U.S. Appl. No. 12/479,179 (Sep. 13, 2012).
European Search Report for European Patent Application No. EP 09 75 9499 (Sep. 12, 2012).
Applicant-Initiated Interview Summary for U.S. Appl. No. 13/225,390 (Aug. 13, 2012).
Non-Final Official Action for U.S. Appl. No. 13/042,294 (Jun. 20, 2012).
3GPP, "Policy Charging Control Over Rx Reference Point," 3GPP ETSI TS 29.214 version 8.3.0 Release 8 (Feb. 2009).
3rd Generation Partnership Project, "Technical Specification Group Core Network and Terminals; Policy and Charging Control over Gx Reference Point," 3GPP TS 29.212, V8.0.0, Release 8 (May 2008).
Communication Under Rule 71(3) EPC for European Patent Application No. 09759499.8 (Aug. 14, 2013).
Non-Final Office Action for U.S. Appl. No. 13/024,967 (Aug. 5, 2013).
Notice of Allowance and Fee(s) Due for U.S. Appl. No. 12/479,179 (Jul. 9, 2013).
Interview Summary for U.S. Appl. No. 12/479,179 (Jul. 1, 2013).
Final Office Action for U.S. Appl. No. 13/048,597 (Jun. 21, 2013).
Non-Final Office Action for U.S. Appl. No. 13/157,052 (Jun. 6, 2013).
First Office Action for Chinese Patent Application No. 200980130515.0 (Apr. 24, 2013).
Non-Final Office Action for U.S. Appl. No. 13/048,607 (Mar. 4, 2013).
"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 1:1.1" ETSI TS 129 219 V11.2.0, pp. 1-22 (Oct. 2012).

* cited by examiner

METHODS, SYSTEMS, AND COMPUTER READABLE MEDIA FOR PROVIDING GROUP POLICY CONFIGURATION IN A COMMUNICATIONS NETWORK USING A FAKE USER

PRIORITY CLAIM

This application claims the benefit of U.S. Provisional Patent Application Ser. No. 61/292,058 filed Jan. 4, 2010 and U.S. Provisional Patent Application Ser. No. 61/405,631 filed Oct. 21, 2010; the disclosures of which are incorporated herein by reference in their entireties.

TECHNICAL FIELD

The subject matter described herein relates to policy configuration. More specifically, the subject matter relates to methods, systems, and computer readable media for providing group policy configuration in a communications network using a fake user.

BACKGROUND

Traditionally, control of quality of service (QoS) within telecommunications networks has been achieved using a combination of best-effort data delivery, network resources reservation, or data packet marking on data communication paths. However, the design of emerging next generation network (NGN) architectures (e.g., IMS, 3G, GSM, 3GPP, and Long Term Evolution (LTE)) will render this approach no longer viable. One feature of network topology within the various NGNs is that the signaling required to negotiate a data transfer (e.g., application signaling) may not travel on the same logical path as the actual data transfer itself (e.g., data traffic). Therefore, a policy entity is needed to link the application signaling on the service plane to data traffic on the transport plane in order to allow applications to request QoS to be performed on the traffic plane.

One example of such a policy entity is a policy and charging rules function (PCRF). PCRF evolved out of the 3GPP (third generation partnership product) specification as a component for IP Multimedia Subsystem networks (IMS). Today, PCRF is not exclusively tied to IMS networks but is applicable across many network types.

A policy and charging rules function (PCRF), or policy engine, at its most basic level, is a server that deploys a set of operator-created business rules in a communications network. These rules can be used to define how broadband network resources should be allocated to subscribers and applications and under what conditions. The PCRF is a policy decision point that may be centrally located in the network and communicates with access edge devices (e.g., policy enforcement points), applications, and operational support systems/business support systems (OSS/BSS) platforms to manage subscriber and network information according to the established rules. Policy rules encompass the business and technological rules that govern which network services a subscriber can access, at what bandwidth level, when, and for how long. Generally speaking, the PCRF queries, coordinates, and adjusts all of the network resources needed to provide the required services to individual, authorized subscribers. As such, the PCRF operates solely in the control plane and does not operate in the data plane. More specifically, the PCRF identifies appropriate policy rules by querying a subscription profile repository (SPR) and enforces them by sending them to, for example, a policy and charging enforcement function (PCEF).

One drawback to current PCEF operation is that policy is only defined on an individual, per-subscriber basis. For example, when a PCRF requests subscription information from a subscription profile repository (SPR) in order to determine a policy to be applied, the query returns data for a single subscriber. Currently no mechanism exists for defining and/or querying subscription profile information for groups of subscribers. As a result, in situations where many subscribers may share the same or similar profile information and, therefore, the same or similar policy rules, a high amount of network resources are required to individually store, obtain, and implement policies for groups of subscribers.

Accordingly, in light of these difficulties, a need exists for improved methods, systems, and computer readable media for leveraging existing mechanisms to provide group policy configuration in communications networks.

SUMMARY

Methods, systems, and computer readable media for providing group policy configuration in a communications network using a fake user are disclosed. The method is performed at a policy and charging rules function (PCRF) node. According to one method, first policy profile information associated with a first subscriber identifier is obtained from a policy profile database, where the first subscriber identifier is associated with a first subscriber. Second policy profile information associated with a second subscriber identifier is obtained from the policy profile database, where the second subscriber identifier is associated with a group of subscribers that also includes the first subscriber. At least a portion of the second policy profile information is applied to the first subscriber.

A system for providing group policy configuration in a communications network using a fake user is also disclosed. The system includes a policy profile database configured to obtain first policy profile information associated with a first subscriber identifier and second policy profile information associated with a second subscriber identifier. The first subscriber identifier is associated with a first subscriber. The second subscriber identifier is associated with a group of subscribers that includes the first subscriber. A policy and charging rules function (PCRF) is configured to apply at least a portion of the second policy profile information to the first subscriber.

The subject matter described herein for providing group policy configuration in a communications network using a fake user may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

TERMINOLOGY

As used herein, the term "node" refers to a computing platform having at least one processor and at least one network interface.

As used herein, the term "chargeable event" refers to activity utilizing telecommunications network resources and related services for: user-to-user communication (e.g. a single call, a data communication session or a short message), user-to-network communication (e.g. service profile administration), inter-network communication (e.g. transferring calls, signalling, or short messages), and/or mobility (e.g. roaming or inter-system handover) that the network operator may want to charge for. A chargeable event characterises the resource/service usage and indicates the identity of the involved end user(s).

As used herein, the term "charging" refers to a function within a telecommunications network and associated OCS/BD components whereby information related to a chargeable event is collected, formatted, transferred and evaluated in order to make it possible to determine usage for which the charged party may be billed (offline charging) or the subscribers account balance may be debited (online charging).

As used herein, the term "offline charging" refers to a charging mechanism where charging information does not affect, in real-time, the service rendered.

As used herein, the term "online charging" refers to a charging mechanism where charging information can affect, in real-time, the service rendered and therefore a direct interaction of the charging mechanism with session/service control is required.

As used herein, the term "subscriber" refers to an entity (associated with one or more users) that is engaged in a subscription with a service provider.

As used herein, the term "subscription" refers to a description of a commercial relationship between a subscriber and a service provider.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing group policy configuration in a communications network using a fake user. As mentioned above, conventionally, the SPR serves as a database for particular users and is queried by the PCRF for a profile of a specific user. However, it would be useful for an operator to provision system parameters via the SPR, including the ability to dynamically push (i.e., unsolicited) these policies to the PCRF at any time. The present subject matter leverages existing mechanisms to allow operators to use the SPR for system-wide provisioning and to dynamically push policies to the PCRF by creating a dummy/fake user that is known by both the PCRF and the SPR. The policy information for the fake user can be associated with one or more real users at the PCRF. In other words, a group policy may be used to override individual policy settings by using the fake user information.

It may be appreciated that the subject matter described herein may be applied to a wide variety of communications technologies (e.g., Internet, telecom, etc.) as these technologies increasingly converge in modern communications networks. By applying the subject matter described herein to a converged communications network, the user may apply the same policy to his home television account, mobile phone, dorm room, etc. Exemplary groups may associate one or more subscribers based on operator-configurable criteria (e.g., bronze, silver, and gold group). Similarly, subscribers may be grouped into families (e.g., family1, family2, etc.) based on their status as members of a predefined group. It is further appreciated that a user may belong to more than one group (e.g., subscriber1 may be a member of family1 and Gold group). By applying policy settings of fake users to multiple subscribers, group policy settings may be implemented by network operators, which is not possible using conventional QoS control methods.

According to another aspect of the subject matter described herein, it may be appreciated that the PCRF may use a regular subscriber ID to query an SPR initially, and then determine whether the subscriber belongs to a group when responding to a DIAMETER credit control request (CCR) message with a DIAMETER credit control application (CCA) message. The PCRF may then override the individual policy settings with group information associated with the fake user. Additional details of the subject matter described herein will now be described below with the aid of the following figures.

Figure 1:
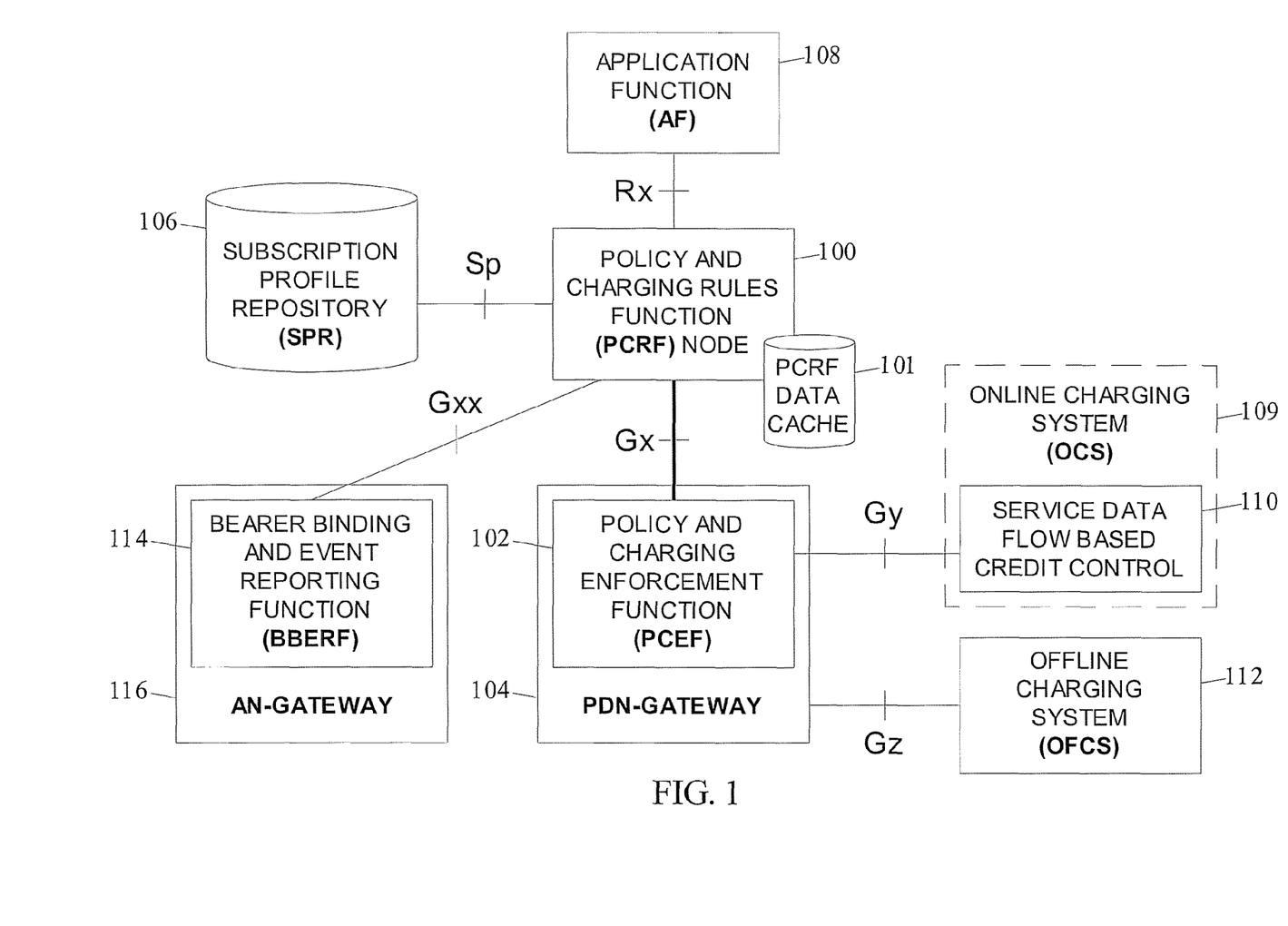
FIG. 1 is a network diagram showing an exemplary policy and charging control (PCC) architecture over Gx reference point suitable for providing group policy configuration in a communications network using a fake user according to an embodiment of the subject matter described herein.

FIG. 1 is a network diagram showing an exemplary policy and charging control (PCC) architecture over Gx reference point suitable for providing group policy configuration in a communications network using a fake user according to an embodiment of the subject matter described herein. Referring to FIG. 1, policy control and charging rules function (PCRF) 100 includes a functional element that encompasses policy control decision and flow based charging control functionalities. PCRF 100 provides network control regarding the service data flow detection, gating, QoS and flow based charging towards the policy and charging enforcement function (PCEF) 102. PCRF 100 receives session and media related information from the application function and informs the application function of traffic plane events. PCRF 100 may provision PCC rules to PCEF 102 via the Gx reference point. PCC rule decisions may be based on one or more of the following: information obtained from AF via the Rx reference point (e.g. the session, media and subscriber related information), information obtained from PCEF 102 via the Gx reference point (e.g. Internet Protocol Connectivity Access Network (IP-CAN) bearer attributes, request type and subscriber related information), information obtained from SPR 106 via the Sp reference point (e.g. subscriber and service related data), and own PCRF pre-configured information. If the information from PCEF 102 contains traffic mapping information not matching any service data flow filter known to PCRF 100, and PCRF 100 allows the UE to request enhanced QoS for services not known to PCRF 100, PCRF 100 adds this traffic mapping information as service data flow filters to the corresponding authorized PCC rule. PCRF 100 may wildcard missing filter parameters, e.g., missing uplink TFT address and port information in case of GPRS. PCRF 100 reports events to the AF via the Rx reference point. PCRF 100 informs PCEF 102 through the use of PCC rules on the treatment of each service data flow that is under PCC control, in accordance with PCRF 100 policy decision(s). For general packet radio service (GPRS), it is possible to support policy control (i.e. access control and QoS control), on a per-PDP context basis for the user equipment (UE) initiated case.

PCRF 100 may be able to select the bearer control mode that will apply for the IP-CAN session and provide it to PCEF 102 via the Gx reference point. Upon subscription to loss of AF signaling bearer notifications by the AF, PCRF 100 may request to PCEF 102 to be notified of the loss of resources associated to the PCC rules corresponding with AF signaling IP flows, if this has not been requested previously.

PCRF data cache 101 may include PCC rules and policy profile information incorporating information associated with fake users. By using fake user information, PCRF data 101 may include group-based policies that may be applied to multiple subscribers. For example, PCRF 100 may download profiles for both subscriber ID X and group ID Z from a policy profile database, such as SPR 106, where group policies for fake users are provisioned. Based on the service group ID specified in the subscriber X profile, PCRF 100 may modify the policy for subscriber ID X provided by SPR 106 to include one or more policy elements associated with the policy for Group ID Z. PCRF data 101 may then store the resulting modified subscriber profile that combines, or overrides, the guaranteed bitrate policy element specified in the fake group subscriber (group ID Z profile) with the real subscriber (subscriber ID X profile.)

The first policy profile information may be obtained by PCRF 100 from any suitable policy profile database, such as an SPR, an HSS, an AAA server, etc. According to one possible embodiment, the second subscriber identifier may be a fake user identifier known by the policy profile database that is associated with the second policy profile information. Hence, the second policy profile information is not associated with a second "real" subscriber, but rather, with a dummy or "fake" subscriber that does not exist. PCRF 100 may identify appropriate policy rules by querying the subscription policy profile database and enforce them by sending them to a policy and charging enforcement function (PCEF) node or/and Bearer Binding and Event Reporting Function (BBERF) or/and Traffic Detection Function (TDF) or/and Evolved Packet Data Gateway (ePDG). Moreover, according to another embodiment, the policy profile database may be configured to push the second policy profile information to plural PCRF nodes and the plural PCRF nodes may be configured to override individual policies with the group policy.

PCEF 102 is a functional element that encompasses policy enforcement and flow based charging functionalities. This functional entity is located at the Gateway (e.g. GGSN in the GPRS case, and PDG in the WLAN case). PCEF 102 provides control over the user plane traffic handling at the gateway and its QoS, and provides service data flow detection and counting as well as online and offline charging interactions. For a service data flow that is under policy control, PCEF 102 may allow the service data flow to pass through the gateway if the corresponding gate is open. For a service data flow that is under charging control, PCEF 102 may allow the service data flow to pass through the Gateway if there is a corresponding active PCC rule and, for online charging, the OCS has authorized the applicable credit with that charging key. PCEF 102 may let a service data flow pass through the gateway during the course of the credit re-authorization procedure. If requested by PCRF 100, PCEF 102 may report to PCRF 100 when the status of the related service data flow changes, which can be used to monitor an IP-CAN bearer dedicated for AF signaling traffic.

Packet data network (PDN) gateway 104 provides connectivity from user equipment (UE) (not shown) to external packet data networks (not shown) by being the point of exit and entry of traffic for the UE. A UE may have simultaneous connectivity with more than one PDN gateway for accessing multiple PDNs. PDN gateway 104 may perform policy enforcement, packet filtering for each user, charging support, lawful interception, and packet screening. PDN gateway 104 may also act as the anchor for mobility between 3GPP and non-3GPP technologies such as WiMAX and 3GPP2 (CDMA 1X and EvDO).

Subscription profile repository (SPR) 106 is a logical entity within the 3GPP PCC architecture that contains information related to subscribers and subscriptions (PCC rules). This information is used by PCRF 100 to facilitate decision making procedures and can include information on the subscriber's permitted services, service pre-emption priorities, allowed QoS and charging related data. One example of SPR 106 may include an IMS Home Subscriber Server (HSS). A PCC rule may consist of a: rule name, service identifier, service data flow filter(s), precedence, gate status, QoS parameters, charging key (i.e. rating group), other charging parameters, and monitoring key. The rule name may be used to reference a PCC rule in the communication between the PCEF and the PCRF. The service identifier may be used to identify the service or the service component the service data flow relates to. The service flow filter(s) may be used to select the traffic for which the rule applies. It may be possible to define wildcarded service data flow filter(s), both for the dynamic and predefined PCC rules. The gate status indicates whether the service data flow, detected by the service data flow filter(s), may pass (gate is open) or shall be discarded (gate is closed) in uplink and/or in downlink direction. The QoS information includes the QoS class identifier (authorized QoS class for the service data flow), the Allocation and Retention Priority (ARP) and authorized bitrates for uplink and downlink. The charging parameters define whether online and offline charging interfaces are used, what is to be metered in offline charging, on what level the PCEF shall report the usage related to the rule, etc. For different PCC rules with overlapping service data flow filter, the precedence of the rule determines which of these rules is applicable. When a dynamic PCC rule and a predefined PCC rule have the same precedence, the dynamic PCC rule may take precedence. PCC rules may also include AF record information for enabling charging correlation between the application and bearer layer if the AF has provided this information via the Rx interface. The monitoring key for a PCC rule identifies a monitoring control instance that may be used for usage monitoring control of the service data flows controlled by the predefined PCC rule or dynamic PCC rule.

Application function (AF) 108 is configured to dynamically transfer service information to PCRF 100 to allow PCRF 100 to make decisions based on policy. In addition, AF 108 may also receive IP-CAN specific information and notification regarding IP-CAN bearer level events. A particular example of AF 108 may include a proxy-call session control function (P-CSCF).

Online charging system (OCS) 109 determines in real-time or near real-time whether the subscriber is authorized to perform a given action based on their prepaid credit status. Depending on whether, for example, immediate event charging (IEC) or event charging with unit reservation (ECUR) is used, OCS 109 may immediately authorize or disallow the completion of a chargeable event or may reserve a number of prepaid credits and either reauthorize additional credits or terminate a subscriber's session once the reserved credits have been used. This determination may be made in conjunction with prepaid application which contains prepaid credit status information associated with subscribers. For example, OCS 109 may query a prepaid application to determine whether a subscriber possesses enough credit to complete a desired transaction, such as a placing VoIP call or delivering a text message. Additionally, OCS 109 may copy accounting messages associated with a charging event and provide the copied messages to a downstream application for additional processing.

Service data flow based credit control 110 may perform online credit control functions together with OCS 109.

Offline Charging system (OFCS) 112 may generate charging events based on the observation of network resource usage. In networks and service elements that provide charging information, OFCS 112 may be the focal point for collecting and processing the information pertaining to chargeable events.

Bearer binding and event reporting function (BBERF) 114 may include a functional element within AN-gateway 116. BBERF 114 may provide control over user plane traffic handling and encompasses the following functionalities: bearer binding, uplink bearer binding verification, and event reporting. For a service data flow that is under QoS control, BBERF 114 may ensure that the service data flow is carried over the bearer with the appropriate QoS class. BBERF 114 may report events to PCRF 100 based on the event triggers installed by the PCRF 100.

Access network (AN) gateway 116 refers to the serving gateway (S-GW) when Gxc applies and to a trusted non-3GPP access gateway when Gxa applies.

Figure 2:
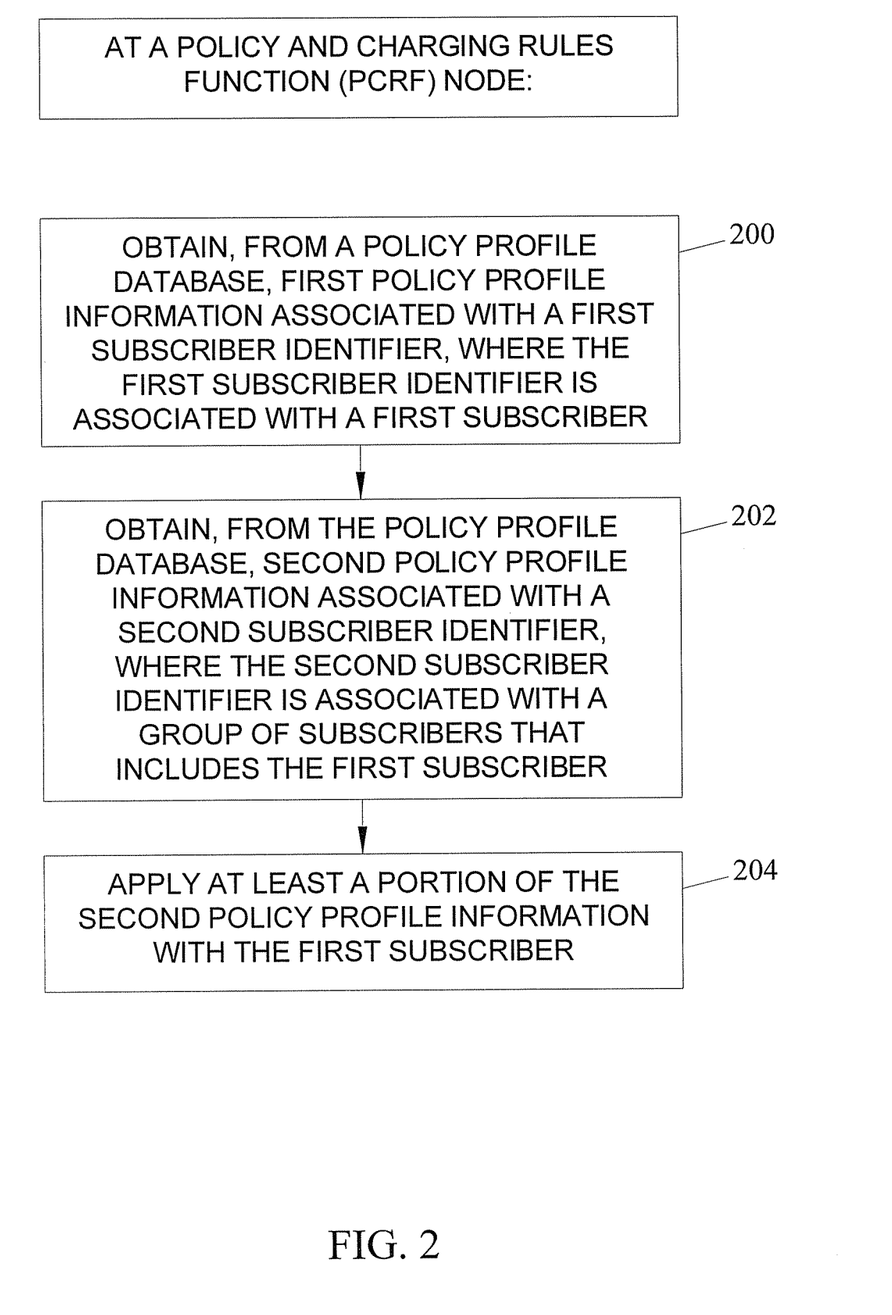
FIG. 2 is flow chart illustrating exemplary steps for providing group policy configuration in a communications network using a fake user according to an embodiment of the subject matter described herein.

FIG. 2 is flow chart illustrating exemplary steps for providing group policy configuration in a communications network using a fake user according to an embodiment of the subject matter described herein. Referring to FIG. 2, at step 200, first policy profile information associated with a first subscriber identifier is obtained from a policy profile database, where the first subscriber identifier is associated with a first subscriber. For example, referring to Table 1 shown below, subscriber ID X may be associated with a service level grouping identified by group ID 1. This service level grouping may be associated with a particular maximum download bitrate X but no guaranteed download bitrate (as indicated by a dash).

TABLE 1

Exemplary Subscriber Profile Repository (SPR) Data

| Subscriber ID | Service Level Group ID | Max Download Bitrate | Guaranteed Download Bitrate |
|---|---|---|---|
| SubID X | 1 | Bitrate X | — |
| GroupID Z | 1 | — | Bitrate Z |

The first policy profile information may be obtained by PCRF 100 from any suitable policy profile database, such as an SPR, an HSS, an AAA server, etc. In one example, policy information may be obtained from SPR 106 in response to a DIAMETER credit control request (CCR) message being sent by PCEF 102 as part of an IP CAN establishment procedure requesting policy and charging control (PCC) rules. In another example, policy information may be obtained from SPR 106 at bootup. It may be appreciated, however, that the above scenarios are exemplary and that the subject matter describe herein is not intended to be limited to obtaining policy profile information at any specific time.

The first policy profile information may be obtained by PCRF 100 using either a PULL or a PUSH procedure. A PULL procedure may occur when provisioning is solicited by PCEF 102. For example, in response to a request for PCC rules being made by PCEF 102, PCRF 100 may provision PCC rules using a CC-Answer message. A PUSH procedure may occur when provisioning is unsolicited. For example, PCRF 100 may decide to provision PCC rules without obtaining a request from PCEF 102, e.g., in response to information provided to the PCRF via the Rx reference point, or in response to an internal trigger within PCRF 100. In order to provision PCC rules without a request from PCEF 102, PCRF 100 may include the PCC rules in an RA-Request message. It may be appreciated that group ID Z may be formatted the same as a real subscriber identifier (e.g., IMSI).

At step 202, second policy profile information associated with a second subscriber identifier is received from the policy profile database, where the second subscriber identifier is associated with a group of subscribers that includes the first subscriber. For example, group ID Z may also be associated with service level group ID 1. Group ID Z may be associated with a guaranteed download bitrate Z, but no maximum download bitrate. In example above, the PCRF may determine the association between group ID Z and subscriber ID X using the data from the group ID field in Table 1 received from the SPR. Alternatively, the SPR database may not include the group ID field illustrated above in Table 1. In such a case, the PCRF and/or the SPR may maintain a group ID database that, in this example, contains group ID Z and all individual subscriber identifiers associate with Group ID Z. The PCFR and/or the SPR may use the group ID database to recognize a subscriber identifier as being associated with group, to identify individual subscriber identifiers that are members of the group, and to apply the group policy to the individual subscribers. Table 2 shown below illustrates an example of a group ID database that may be maintained by the SPR and/or the PCRF.

TABLE 2

Exemplary Group Policy ID Database

| Group ID ID | Individual Subscriber Group Member IDs | Max Download Bitrate | Guaranteed Download Bitrate |
|---|---|---|---|
| GroupID Z | SubID X<br>Sub ID X1<br>SubID X2 | — | Bitrate Z |
| Group ID Z1 | SubID X3<br>SubIDX4<br>SubIDX5 | — | Bitrate Z1 |

In Table 2, two group identifiers Z and Z1 are illustrated, each with associate members. Using data such as this, the PCRF can determine not only that a subscriber identifier for which a policy is requested is a group policy, but also the individual subscriber identifiers in the group to which the policy should be applied. The PCRF may obtain this data from the SPR or may be provisioned by the network operator with this data.

At step 204, at least a portion of the second policy profile information is associated with the first subscriber. For example, PCRF 100 may download both profiles for subscriber ID X and group ID Z from SPR 106. Based on the service group ID 1 specified in the subscriber X profile, PCRF 100 may modify the policy for subscriber ID X provided by SPR 106 to include one or more policy elements associated with the policy for Group ID Z provided by SPR 106. Continuing the example above, PCRF 100 may apply the guaranteed bitrate policy element specified in the fake group subscriber (group ID Z profile) to the real subscriber (subscriber ID X profile.) Table 3 illustrates the policy profile for subscriber X resulting from the association created by PCRF 100 and stored in PCRF data cache 101. As set forth above, even though Table 3 includes the service level group identifier, this field may be omitted without departing from the scope of the subject matter described herein.

TABLE 3

Exemplary policy profile for subscriber X that may be created and/or stored at the PCRF.

| Subscriber ID | Service Level Group ID | Max Download Bitrate | Guaranteed Download Bitrate |
|---|---|---|---|
| SubID X | 1 | Bitrate X | Bitrate Z |

PCRF 100 may respond by returning a DIAMETER credit control application (CCA) message to PCEF 102.

Figure 3A:
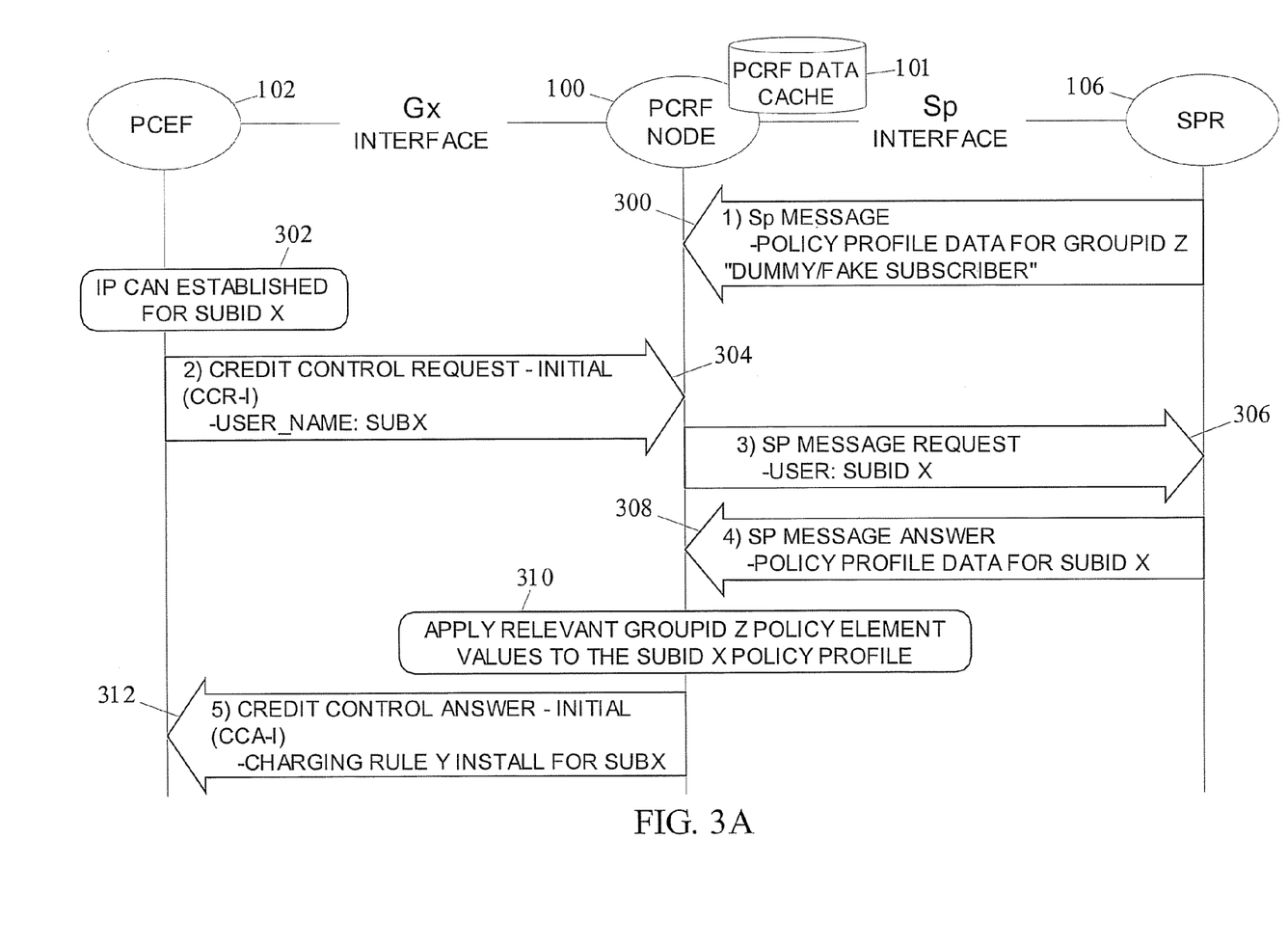
FIGS. 3A and 3B are message sequence diagram illustrating an exemplary process for providing group policy configuration in a communications network using a fake user according to an embodiment of the subject matter described herein.

FIG. 3A is a message sequence diagram illustrating an exemplary process for providing group policy configuration in a communications network using a fake user according to an embodiment of the subject matter described herein. Referring to FIG. 3A, at step 300, SPR 106 may send a SP message to PCRF 100 that includes policy profile data for a dummy/fake subscriber (e.g., GroupID Z).

At step 302, PCEF 102 may establish a session for subscriber ID X through an IP Connectivity Access Network (e.g. WLAN). IP-CAN is a collection of network entities and interfaces that provides IP transport connectivity between UEs and core network entities. In one exemplary IP-CAN session establishment scenario, PCEF 102 may receive an IP-CAN session creation request. The IP-CAN session creation request may be a GTP message, or a trigger message unrelated to the 3G network. As further description of conventional IP-CAN session establishment is not necessary to understand the subject matter described herein, details will be omitted for clarity.

At step 304, PCEF 102 may send a credit control request initial (CCR-I) message for subscriber ID X to PCRF 100 and is used between a Diameter credit-control client and a credit-control server to request credit authorization for a given service.

At step 306, PCRF 100 may send a subscriber profile (SP) Message Request for subscriber ID X to SPR 106 for obtaining policy profile data for subscriber ID X.

At step 308, SPR 106 may respond to the SP Message Request by returning an SP Message Answer that includes policy profile data for subscriber ID X.

At step 310, PCRF 100 may apply relevant group ID Z policy element values to the subscriber ID X policy profile. PCRF 100 may perform a lookup in PCRF data cache 101 and determine that charging rule Y should be applied to subscriber ID X.

At step 312, PCRF 100 may send a credit control answer (CCA) message corresponding to the CCR sent in step 304. The CCA message may include a charging rule Y Install for subscriber ID X.

Figure 3B:
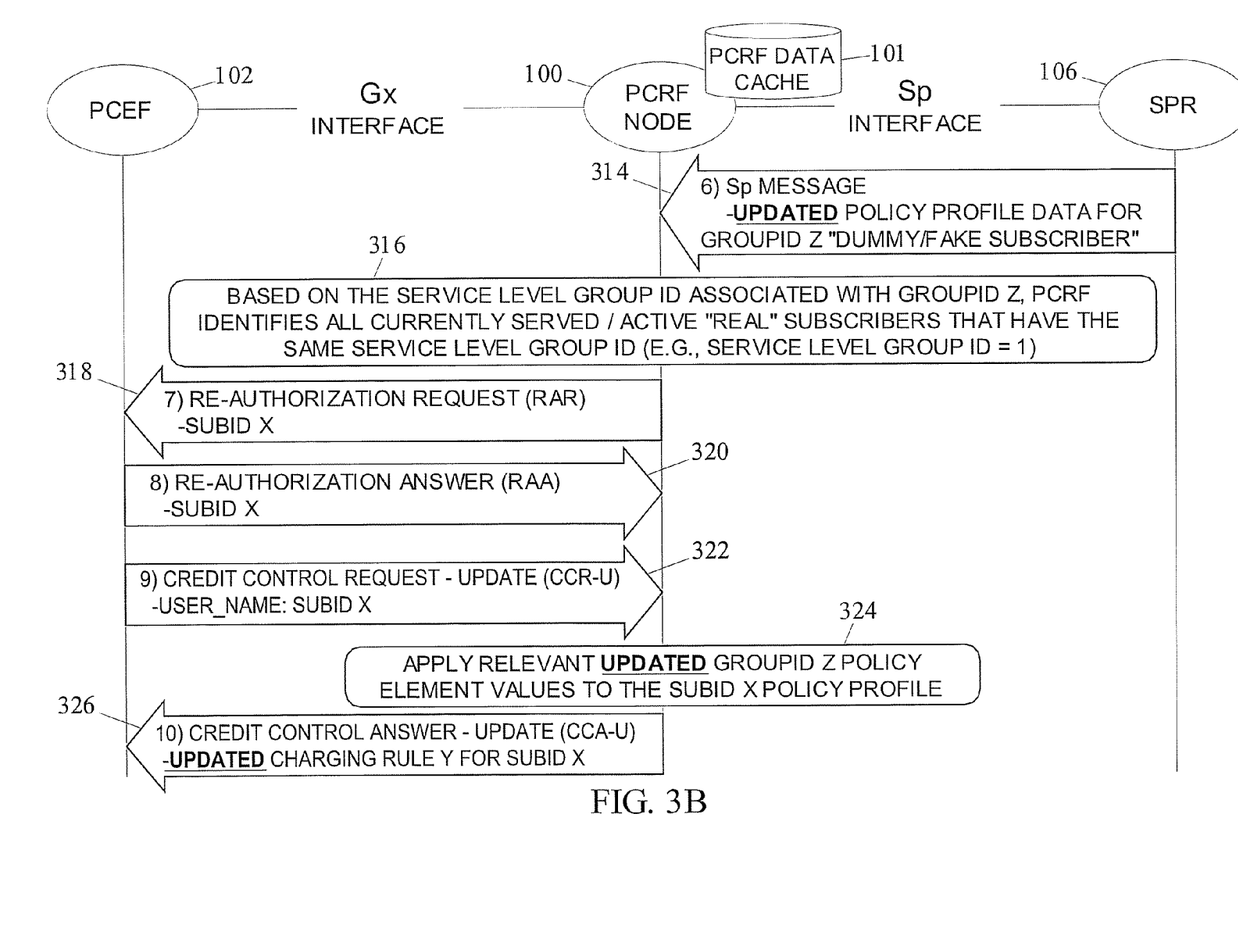

FIG. 3B is a message sequence diagram that continues the exemplary process for providing group policy configuration in a communications network using a fake user according to an embodiment of the subject matter described herein illustrated in FIG. 3A. Referring to FIG. 3B, the policy profile information obtained and applied in FIG. 3A may be updated and the updated policy information may be provided to PCEF 102. For example, at step 314, SPR 106 may send an SP message to PCRF 100 that includes updated policy profile data for the dummy/fake subscriber (e.g., Group ID Z). The SP message may either be pushed to PCRF 100 at bootup (i.e., initialization time) or pushed (i.e., unsolicited) anytime.

At step 316, PCRF 100 may identify all currently served/active "real" subscribers that have the same service level group ID as the fake subscriber (e.g., Group ID Z). For example, Group ID Z may be associated with Service Level Group ID 1.

At step 318, PCRF 100 may send a re-authorization request (RAR) message for subscriber ID X.

At step 320, PCEF 102 may return a re-authorization answer (RAA) message in response to the RAR sent in step 318 for subscriber ID X.

At step 322, PCEF 102 may send a credit control request for subscriber ID X that updates CCR-U.

At step 324, PCRF 100 may apply relevant updated policy element values associated with group ID Z to the profile of subscriber ID X.

At step 326, PCRF 100 may return a credit control answer message to PCEF 102 in response to the credit control request sent in step 322. The credit control answer may update CCA-U and include updates charging rule Y for subscriber ID X.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing group policy configuration in a communications network, the method comprising:
   at a policy and charging rules function (PCRF) node:
      obtaining, from a policy profile database, first policy profile information associated with a first subscriber identifier, wherein the first subscriber identifier is associated with a first subscriber;
      obtaining, from the policy profile database, group policy profile information associated with a group identifier, wherein the group identifier is associated in the policy profile database with a group of subscriber identifiers that includes the first subscriber identifier;
      determining whether the group policy profile information applies to the first subscriber identifier by performing a lookup using the first subscriber identifier; and
      in response to determining that the group policy profile information applies to the first subscriber identifier, applying at least a portion of the group policy profile information to the first subscriber, wherein the first policy profile information specifies an individual policy profile for the first subscriber, wherein the group policy profile information specifies a group policy profile for the group, and wherein applying at least a portion of the group policy profile to the first subscriber includes creating and storing in the PCRF a new policy profile for the subscriber that includes policy elements from the individual policy profile and the group policy profile.

2. The method of claim 1 wherein obtaining the first policy profile information includes obtaining the first policy profile information from one of a subscription profile repository (SPR), a home subscriber server (HSS), and a authentication authorization and accounting (AAA) server.

3. The method of claim 1 wherein obtaining the group policy profile information includes obtaining the group policy profile information from one of a subscription profile repository (SPR), a home subscriber server (HSS), a authentication authorization and accounting (AAA) server, a group policy server, and a group policy provisioning system.

4. The method of claim 1 wherein applying at least a portion of the group policy profile information to the first subscriber includes generating a policy rule for the first subscriber based on the first policy profile information and the group policy profile information.

5. The method of claim 4 wherein applying at least a portion of the group policy profile information to the first subscriber includes pushing the policy rule to a policy charging enforcement function (PCEF) that serves the first subscriber.

6. The method of claim 4 wherein applying at least a portion of the group policy profile information to the first subscriber includes pulling, by a policy charging enforcement function (PCEF) that serves the first subscriber, the policy rule from the PCRF, wherein pulling the policy rule includes querying the PCRF for the policy rule.

7. The method of claim 1 wherein the group identifier comprises a fake user identifier known by the policy profile database to be associated with the group policy profile information.

8. The method of claim 1 wherein the policy profile database pushes the group policy profile information to plural PCRF nodes and where the plural PCRF nodes override individual policies with the group policy.

9. A system for providing group policy configuration in a communications network, the system comprising:
   a policy profile database for storing first policy profile information associated with a first subscriber identifier, wherein the first subscriber identifier is associated with a first subscriber and group policy profile information associated with a group identifier, wherein the group identifier is associated in the policy profile database with a group of subscriber identifiers that includes the first subscriber identifiers; and
   a policy and charging rules function (PCRF) node for determining whether the group policy profile information applies to the first subscriber identifier by performing a lookup using the first subscriber identifier, and, in response to determining that the group policy profile information applies to the first subscriber identifier, applying at least a portion of the group policy profile information to the first subscriber, wherein the first policy profile information specifies an individual policy profile for the first subscriber, wherein the group policy profile information specifies a group policy profile for the group, and wherein applying at least a portion of the group policy profile to the first subscriber includes creating and storing in the PCRF a new policy profile for the subscriber that includes policy elements from the individual policy profile and the group policy profile.

10. The system of claim 9 wherein the policy profile database comprises one of a subscription profile repository (SPR), a home subscriber server (HSS), and a authentication authorization and accounting (AAA) server, a group policy server, and a group policy provisioning system.

11. The system of claim 9 wherein the PCRF is configured to generate a policy rule for the first subscriber based on the first policy profile information and the group policy profile information.

12. The system of claim 11 wherein the PCRF is configured to push the policy rule to a policy charging enforcement function (PCEF) that serves the first subscriber.

13. The system of claim 11 wherein the PCRF is configured to provide the policy rule from the policy profile database in response to receiving a request for the policy rule from a policy charging enforcement function (PCEF) that serves the first subscriber.

14. The system of claim 9 wherein the group identifier comprises a fake user identifier known by the policy profile database to be associated with the group policy profile information.

15. The system of claim 9 wherein the policy profile database node pushes the group policy profile information to plural PCRF nodes and where the plural PCRF nodes override individual policies with the group policy.

16. A non-transitory, tangible computer readable medium comprising computer executable instructions embodied in a non-transitory computer readable medium and when executed by a processor of a computer performs steps comprising:
   at a policy and charging rules function (PCRF) node:
      obtaining, from a policy profile database, first policy profile information associated with a first subscriber identifier, wherein the first subscriber identifier is associated with a first subscriber;
      obtaining, from the policy profile database, group policy profile information associated with a group identifier, wherein the group identifier is associated in the policy profile database with a group of subscriber identifiers that includes the first subscriber identifier;
      determining whether the group policy profile information applies to the first subscriber identifier by performing a lookup using the first subscriber identifier; and
      in response to determining that the group policy profile information applies to the first subscriber identifier, applying at least a portion of the group policy profile information to the first subscriber, wherein the first policy profile information specifies an individual policy profile for the first subscriber, wherein the group policy profile information specifies a group policy profile for the group, and wherein applying at least a portion of the group policy profile to the first subscriber includes creating and storing in the PCRF a new policy profile for the subscriber that includes policy elements from the individual policy profile and the group policy profile.

* * * * *